United States Patent
Yang et al.

(10) Patent No.: US 10,844,164 B2
(45) Date of Patent: Nov. 24, 2020

(54) OLIGOMER, COMPOSITION AND COMPOSITE MATERIAL EMPLOYING THE SAME

(71) Applicant: Industrial Technology Research Institute, Hsinchu (TW)

(72) Inventors: Wei-Ta Yang, Taoyuan (TW); Yen-Yi Chu, Chiayi (TW); Ming-Tsung Hong, New Taipei (TW); Li-Chun Liang, Qionglin Township (TW); Yun-Ching Lee, Ji'an Township (TW); Meng-Song Yin, Hsinchu (TW); Hsi-Yi Chin, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 71 days.

(21) Appl. No.: 15/851,309

(22) Filed: Dec. 21, 2017

(65) Prior Publication Data

US 2018/0171068 A1     Jun. 21, 2018

Related U.S. Application Data

(63) Continuation-in-part of application No. 15/394,457, filed on Dec. 29, 2016, now abandoned.
(Continued)

(51) Int. Cl.
    *C08G 61/08*      (2006.01)
    *C08L 45/00*      (2006.01)
    (Continued)

(52) U.S. Cl.
    CPC .............. *C08G 61/08* (2013.01); *C08L 45/00* (2013.01); *C08L 87/00* (2013.01);
    (Continued)

(58) Field of Classification Search
    CPC ............ C08G 61/08; C08G 2261/1412; C08G 2261/1414; C08G 2261/1426;
    (Continued)

(56) References Cited

U.S. PATENT DOCUMENTS 5,182,360 A    1/1993   Jacobine et al.
5,569,730 A    10/1996   Goodall et al.
(Continued)

FOREIGN PATENT DOCUMENTS

CN      1043662 A   *   7/1990
CN      1135225 A     11/1996
(Continued)

OTHER PUBLICATIONS

Floros et al., "Statistical Copolymers of Norbornene and 5-Vinyl-2-norbornene by a Ditungsten Complex Mediated Ring-Opening Metathesis Polymerization: Synthesis, . . . Thermal Decomposition," Journal of Polymer Science, vol. 51,2013 (published online Sep. 16, 2013), pp. 4835-4844. (Year: 2013).*
(Continued)

*Primary Examiner* — Ronald Grinsted
(74) *Attorney, Agent, or Firm* — Birch, Stewart, Kolasch & Birch, LLP

(57) ABSTRACT

An oligomer, composition, and composite material employing the same are provided. The oligomer has a structure represented by Formula (I)

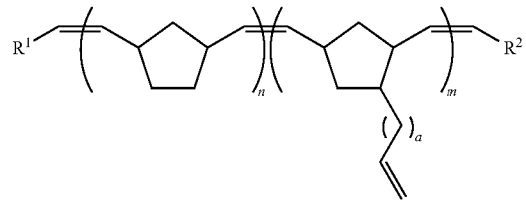

Formula (I)

wherein $R^1$ and $R^2$ are independently hydrogen, $C_{1-20}$ alkyl group, $C_{2-20}$ alkenyl group, $C_{6-12}$ aryl group, $C_{6-12}$ alkylaryl group, $C_{5-12}$ cycloalkyl group, $C_{6-20}$ cycloalkylalkyl group, alkoxycarbonyl group, or alkylcarbonyloxy group; $R^1$ is not hydrogen when $R^2$ is hydrogen; a is 0 or 1; n≥0; m≥1; n:m is from 0:100 to 99:1; the oligomer has a number average molecular weight of less than or equal to 12,000; and the repeat unit

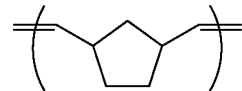

and the repeat unit

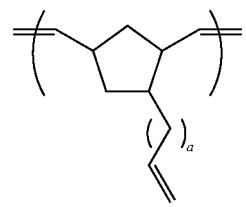

are arranged in a random or block fashion.

17 Claims, No Drawings

Related U.S. Application Data

(60) Provisional application No. 62/340,686, filed on May 24, 2016.

(51) Int. Cl.
*C08L 87/00* (2006.01)
*C08L 57/06* (2006.01)

(52) U.S. Cl.
CPC .............. *C08G 2261/1412* (2013.01); *C08G 2261/1414* (2013.01); *C08G 2261/1426* (2013.01); *C08G 2261/418* (2013.01); *C08L 57/06* (2013.01)

(58) Field of Classification Search
CPC ... C08G 2261/418; C08L 45/00; C08L 87/00; C08L 57/06
USPC ........................................................ 428/394
See application file for complete search history.

(56) References Cited

U.S. PATENT DOCUMENTS

| | | | |
|---|---|---|---|
| 5,571,881 | A | 11/1996 | Goodall et al. |
| 5,741,869 | A | 4/1998 | Goodall et al. |
| 6,239,187 | B1 | 5/2001 | Hatke et al. |
| 6,492,443 | B1 | 12/2002 | Kodemura et al. |
| 7,122,611 | B2 | 10/2006 | Lipian |
| 7,148,302 | B2 | 12/2006 | Lipian |
| 7,291,689 | B1 | 11/2007 | Lee et al. |
| 7,381,782 | B2 | 6/2008 | Sugawara et al. |
| 8,053,531 | B2 | 11/2011 | Hirata et al. |
| 8,568,891 | B2 | 10/2013 | Mizuno et al. |
| 8,609,005 | B2 | 12/2013 | Takeyama et al. |
| 8,685,510 | B2 | 4/2014 | Takahashi et al. |
| 8,748,541 | B2 | 6/2014 | Mori et al. |
| 9,181,360 | B2 | 11/2015 | Holtcamp et al. |
| 9,243,132 | B2 | 1/2016 | Fung et al. |
| 2007/0255031 | A1 | 11/2007 | Lee et al. |
| 2010/0063226 | A1 | 3/2010 | Cho et al. |
| 2017/0342199 | A1 | 11/2017 | Yang et al. |
| 2017/0342200 | A1 | 11/2017 | Hong et al. |
| 2018/0171068 | A1 | 6/2018 | Yang et al. |

FOREIGN PATENT DOCUMENTS

| | | |
|---|---|---|
| CN | 1229094 A | 9/1999 |
| CN | 102660111 B | 9/2013 |
| CN | 103232562 B | 8/2015 |
| CN | 108250720 A | 7/2018 |
| EP | 0807998 B1 | 10/2001 |
| JP | 2522653 B2 | 8/1996 |
| JP | 3588498 B2 | 11/2004 |
| JP | 3971476 B2 | 9/2007 |
| JP | 3978832 B2 | 9/2007 |
| JP | 2007-277572 A | 10/2007 |
| JP | 4313849 B2 | 8/2009 |
| JP | 2010-106216 A | 5/2010 |
| JP | 4548491 B2 | 9/2010 |
| JP | 4754039 B2 | 8/2011 |
| JP | 2011-233422 A | 11/2011 |
| JP | 5278305 B2 | 9/2013 |
| JP | 5278306 B2 | 9/2013 |
| JP | 2015-100984 A | 6/2015 |
| JP | 5810531 B2 | 11/2015 |
| JP | 2016-190988 A | 11/2016 |
| TW | 201823294 A | 7/2018 |
| WO | 2008/081885 A1 | 7/2008 |

OTHER PUBLICATIONS

Bielawski, C.W., et al, "Synthesis of End-Functionalized Poly(norbornene)s via Ring-Opening Metathesis Polymerization," Macromolecules, 2001, vol. 34, pp, 8610-8618. (Year: 2001).*
CN1043662A—machine translation (Year: 1990).*
Sheng et al., "Influence of Cross-link Density on the Properties of ROMP Thermosets," Polymer, vol. 50, 2009 (Available online Jan. 15, 2009), pp. 1264-1269.
Chinese Office Action and Search Report for Chinese Application No. 201711391873.X, dated Nov. 1, 2019.
Balcar et al., "Ring-opening metathesis polymerization of vinylnorbornene and following polymer modifications," Journal of Polymer Research, vol. 21. No. 557, Sep. 2014 (published online Aug. 9, 2014), pp. 1 of 8-8 of 8.
Balcar et al., "RuCI2(p-cymene)(PCy3) immobilized on mesoporous molecular sieves as catalyst for ROMP of norbornene and its derivatives," Journal of Molecular Catalysis A: Chemical, vol. 332, 2010 (available online Aug. 14, 2010), pp. 19-24.
Bielawski, C.W., et al, "Synthesis of End-Functionaiized Poly(norbornene)s via Ring-Opening Metathesis Polymerization," Macromolecules, 2001, vol. 34, pp. 8610-8618.
Endo et al., "Polymerization of 5-vinyl-2-norbornene with TiCI3 and alkylaluminum catalysts," Macromolecular Chemistry and Physics, vol. 197. Issue 1, Jan. 1996, pp. 97-104.
Floros et al., "Statistical Copolymers of Norbornene and 5-Vinyl-2-norbornene by a Ditungsten Complex Mediated Ring-Opening Metathesis Polymerization: Synthesis, . . . Thermal Decomposition," Journal of Polymer Science, vol. 51, 2013 (published online Sep. 16, 2013), pp. 4835-4844.
Górski et al., "Tungston(II)-initiated ring-opening metathesis polymerization and other C—C bond forming reactions of 5-vinyl-2norbornene," Journal of Molecular Catalysis A: Chemical, vol. 257, 2006 (available online May 5, 2006), pp. 41-47.
Janiak et al., "The Vinyl Homopolymerization of Norbornene," Macromolecular Rapid Communications, 2001, vol. 22, No. 7, pp. 479-492.
Martin et al., "Development of a Low-Dielectric-Constant Polymer for the Fabrication of Integrated Circuit Interconnect," Advanced Materials, vol. 12, No. 23. Dec. 1, 2000, pp. 1769-1778.
Taiwanese Office Action for Appl. No. 105143833 dated Jun. 26, 2017.
Taiwanese Office Action for Appl. No. 105144141 dated Apr. 19, 2017.

* cited by examiner

OLIGOMER, COMPOSITION AND COMPOSITE MATERIAL EMPLOYING THE SAME

CROSS REFERENCE TO RELATED APPLICATIONS

This application is a Continuation-In-Part of pending U.S. patent application Ser. No. 15/394,457, filed Dec. 29, 2016 and entitled "Oligomer, composition and composite material employing the same", which claims the benefit of U.S. Provisional Application No. 62/340,686, filed on May 24, 2016, which provisional application is hereby incorporated herein by reference.

TECHNICAL FIELD

The disclosure relates to an oligomer, a composition and a composite material employing the same.

BACKGROUND

The trend in electronic products has been toward smaller sizes, lighter weight, higher operating speeds, and higher-frequency transmission. Therefore, the distribution for printed circuit boards is toward high-density. In order to maintain transmission rate and signal integrity, the ideal materials for use in printed circuit boards must have a low dielectric constant (dielectric constant, Dk) and a low dissipation factor (dissipation factor, Df).

In general, conventional materials for printed circuit boards have a high dielectric constant (dielectric constant, Dk) and a high dissipation factor (dissipation factor, Df). Accordingly, a novel material for use in printed circuit boards is desired in order to improve performance and reduce Dk and Df without sacrificing thermal resistance and mechanical strength.

SUMMARY

According to embodiments of the disclosure, the disclosure provides an oligomer. The oligomer has a structure represented by Formula (I)

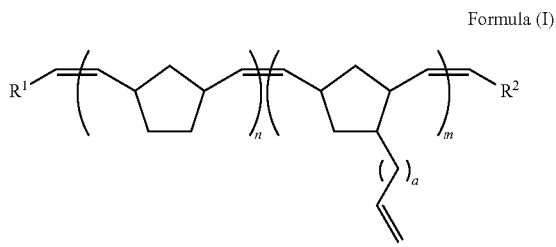

Formula (I)

wherein $R^1$ and $R^2$ are independently hydrogen, $C_{1-20}$ alkyl group, $C_{2-20}$ alkenyl group, $C_{6-12}$ aryl group, $C_{6-12}$ alkylaryl group, $C_{5-12}$ cycloalkyl group, $C_{6-20}$ cycloalkylalkyl group, alkoxycarbonyl group, or alkylcarbonyloxy group, $R^1$ is not hydrogen when $R^2$ is hydrogen; a is 0 or 1; n≥0; m≥1; n:m is from about 0:100 to 99:1; the oligomer number average molecular weight less than or equal to 12,000; and the repeat unit

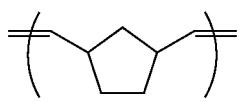

and the repeat unit

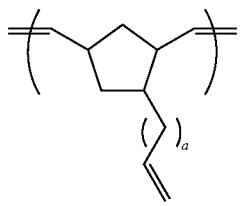

are arranged in a random or block fashion.

According to embodiments of the disclosure, the disclosure also provides a resin composition including about 10-90 parts by weight of the aforementioned oligomer; and about 10-90 parts by weight of resin, wherein the aforementioned oligomer and the resin are 100 parts by weight in total.

According to embodiments of the disclosure, the disclosure also provides a composite material including a cured product or a semi-cured product prepared from the aforementioned resin composition; and a substrate, wherein the cured product or the semi-cured product is disposed on the substrate or disposed within the substrate.

A detailed description is given in the following embodiments with reference to the accompanying drawings.

DETAILED DESCRIPTION

Embodiments of the disclosure provide an oligomer, a composition, and a composite material employing the same. The oligomer of the disclosure can be prepared by copolymerizing a first monomer (such as vinyl norbornene) and a second monomer (such as norbornene) via ring-opening polymerization, and α-olefin can be introduced during copolymerization in order to control the molecular weight of the obtained copolymer (i.e. the obtained copolymer can have a number average molecular weight less than or equal to 12,000). As a result, due to the high solubility in organic solvent, the oligomer exhibits high proccessability. In addition, due to the low polarity and the crosslinkable functional groups of the chemical structure of the oligomer, the oligomer can enhance the mechanical strength of the substrate material when the oligomer is used as a reactant for preparing the substrate material. Embodiments of the disclosure also provide a composition including the aforementioned oligomer and a composite material (such as a prepreg) including a cured product or a semi-cured product prepared from the resin composition. The cured product of the resin composition of the disclosure exhibits a relatively low dielectric constant (Dk) (less than 3.0 (at 10 GHz)) and a relatively low dissipation factor (Df) (less than 0.0045 (at 10 GHz)), and can serve as a good material for the high-frequency substrate in order to improve the problem of insertion loss.

According to embodiments of the disclosure, the oligomer has a structure represented by Formula (I)

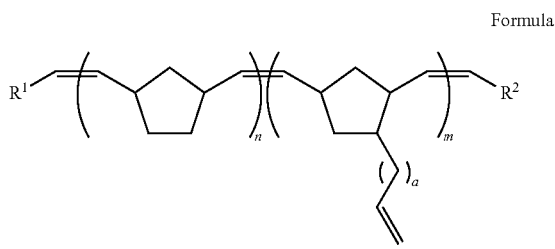

Formula wherein $R^1$ and $R^2$ are independently hydrogen, $C_{1-20}$ alkyl group, $C_{2-20}$ alkenyl group, $C_{6-12}$ aryl group, $C_{6-12}$ alkylaryl group, $C_{5-12}$ cycloalkyl group, $C_{6-20}$ cycloalkylalkyl group, alkoxycarbonyl group, or alkylcarbonyloxy group, $R^1$ is not hydrogen when $R^2$ is hydrogen; a is 0 or 1; $n \geq 0$ (such as $n \geq 1$); $m \geq 1$; n:m is from about 0:100 to 99:1; the oligomer number average molecular weight less than or equal to 12,000; and the repeat unit

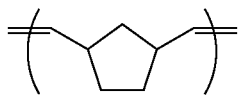

and the repeat unit

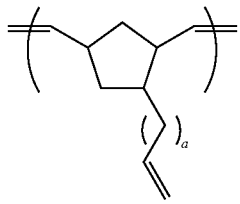

are arranged in a random or block fashion.

According to embodiments of the disclosure, the alkyl group of the disclosure can be linear or branched alkyl group. For example, $R^1$ and $R^2$ can be independently a linear or branched alkyl group having 1, 2, 3, 4, 5, 6, 7, 8, 9, 10, 11, 12, 13, 14, 15, 16, 17, 18, 19, or 20 carbon atoms. According to embodiments of the disclosure, the alkenyl group of the disclosure can be linear or branched alkenyl group. For example, $R^1$ and $R^2$ can be independently a linear or branched alkenyl group having 2, 3, 4, 5, 6, 7, 8, 9, 10, 11, 12, 13, 14, 15, 16, 17, 18, 19, or 20 carbon atoms.

According to embodiments of the disclosure, $R^1$ and $R^2$ can be independently hydrogen, or

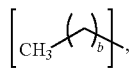

wherein b can be 0, 1, 2, 3, 4, 5, 6, 7, 8, 9, 10, 11, 12, 13, 14, 15, 16, 17, 18, or 19; and $R^1$ is not hydrogen when $R^2$ is hydrogen.

According to embodiments of the disclosure, the $C_{6-12}$ aryl group of the disclosure can be phenyl group, biphenyl group, or naphthyl group.

According to embodiments of the disclosure, $R^1$ and $R^2$ are independently hydrogen, or

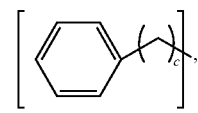

wherein c can be 0, 1, 2, 3, 4, 5, or 6; and $R^1$ is not hydrogen when $R^2$ is hydrogen.

According to embodiments of the disclosure, $R^1$ and R2 can be independently hydrogen, or

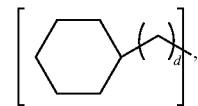

wherein d can be 0, 1, 2, 3, 4, 5, or 6; and $R^1$ is not hydrogen when $R^2$ is hydrogen.

According to embodiments of the disclosure, $R^1$ and $R^2$ can be independently hydrogen, or

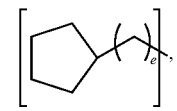

wherein e can be 0, 1, 2, 3, 4, 5, or 6; and $R^1$ is not hydrogen when $R^2$ is hydrogen.

According to embodiments of the disclosure, $R^1$ and $R^2$ can be independently hydrogen, or

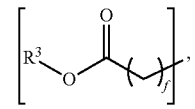

wherein f can be 0, 1, 2, 3, 4, 5, or 6, $R^3$ can be $C_{1-6}$ alkyl group, $R^1$ is not hydrogen when $R^2$ is hydrogen. For example, $R^3$ can be methyl group, ethyl group, propyl group, isopropyl group, butyl group, isobutyl group, tert-butyl group, pentyl group, or hexyl group.

According to embodiments of the disclosure, $R^1$ and $R^2$ can be independently hydrogen, or

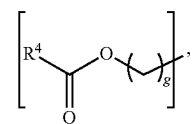

wherein g can be 0, 1, 2, 3, 4, 5, or 6, $R^4$ can be $C_{1-6}$ alkyl group; and $R^1$ is not hydrogen when $R^2$ is hydrogen. For example, $R^4$ can be methyl group, ethyl group, propyl group, isopropyl group, butyl group, isobutyl group, tert-butyl group, pentyl group, or hexyl group.

According to embodiments of the disclosure, $R^1$ and $R^2$ can be independently hydrogen, or

wherein h can be 1, 2, 3, 4, 5, or 6; and $R^1$ is not hydrogen when $R^2$ is hydrogen.

According to embodiments of the disclosure, $R^1$ and $R^2$ can be independently hydrogen, or

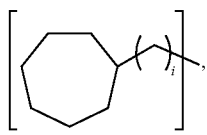

wherein i can be 0, 1, 2, 3, 4, 5, or 6; and $R^1$ is not hydrogen when $R^2$ is hydrogen.

According to embodiments of the disclosure, $R^1$ and $R^2$ can be independently hydrogen, or

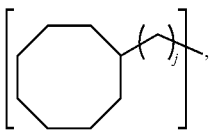

wherein j can be 0, 1, 2, 3, 4, 5, or 6; and $R^1$ is not hydrogen when $R^2$ is hydrogen.

According to embodiments of the disclosure, the ratio of the repeat unit

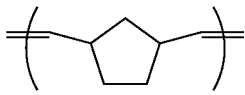

to the repeat unit

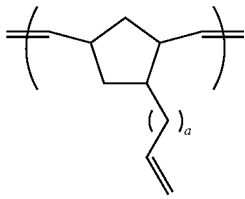

(i.e. n:m) can be from about 0:100 to 99:1, such as from about 1:9 to 9:1, from about 2:8 to 8:2, from about 3:7 to 7:3, or from about 3:7 to 6:4. Due to the adjustment of the ratio between the two repeat units of the oligomer, the properties of the cured product prepared by crosslinking the oligomer and the resin can be modified. For example, when increasing the amount of the repeat unit

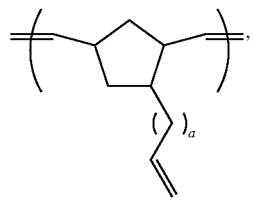

the crosslinking density of the cured product can be increased.

In embodiments of the disclosure, due to the introduction of the α-olefin when copolymerizing vinyl norbornene with norbornene, the molecular weight of the copolymer can be controlled. According to embodiments of the disclosure, the number average molecular weight of the oligomer can be less than 12,000, such as from about 800 to 12,000, from about 800 to 9,000, from about 800 to 8,000, from about 800 to 7,000, from about 800 to 6,000, or from about 800 to 5,000. As a result, the oligomer can have high solubility in organic solvent, thereby enhancing the proccessability of the oligomer. In addition, in comparison with the copolymer merely prepared from vinyl norbornene and norbornene, the oligomer of the disclosure exhibits superior storability.

According to embodiments of the disclosure, the method for preparing the aforementioned oligomer can include mixing and reacting a first monomer, a second monomer, and α-olefin to obtain the oligomer.

According to embodiments of the disclosure, the method for preparing the aforementioned oligomer can include mixing and reacting a metal catalyst, a first monomer, a second monomer, and α-olefin to obtain the oligomer.

According to embodiments of the disclosure, the method for preparing the aforementioned oligomer can include mixing and reacting a photoredox initiator, a photoredox mediator, a first monomer, a second monomer, and α-olefin to obtain the oligomer. In particular, the photoredox initiator can be vinyl ether, 1-methoxy-4-phenyl butene, 2-cyclohexyl-1-methoxyethylene, or a combination thereof. The photoredox mediator can be pyrylium salt, acridinium salt, or a combination thereof.

According to embodiments of the disclosure, the method for preparing the aforementioned oligomer can include mixing and reacting a first monomer, a second monomer, and α-olefin under electrochemical condition to obtain the oligomer.

The metal catalyst can be Grubbs catalyst, such as first-generation Grubbs catalyst, second-generation Grubbs catalyst, Hoveyda-Grubbs catalyst, derivatives thereof, or a combination including at least one of the above catalysts. The first monomer can be

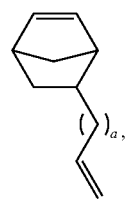

wherein a is 0 or 1. For example, the first monomer is vinyl norbornene. The second monomer can be norbornene

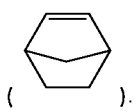

The α-olefin can be

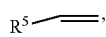

wherein $R^5$ can be $C_{1-20}$ alkyl group, $C_{2-20}$ alkenyl group, $C_{6-12}$ aryl group, $C_{6-12}$ alkylaryl group, $C_{5-12}$ cycloalkyl group, $C_{6-20}$ cycloalkylalkyl group, alkoxycarbonyl group, or alkylcarbonyloxy group. for example, α-olefin can be

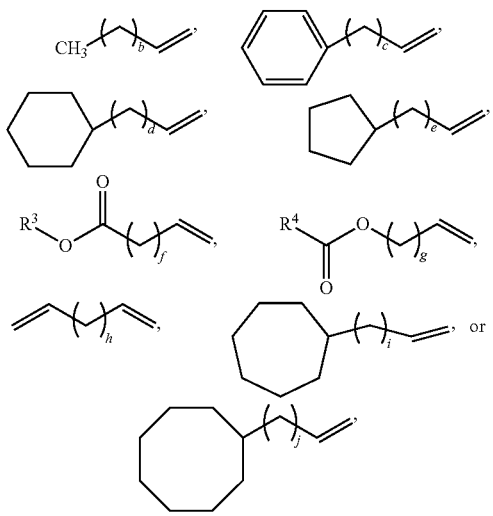

wherein b, c, d, e, f, g, h, i, j, $R^3$, and $R^4$ have the same definition as above. In the aforementioned methods for preparing the oligomer, the sequence in which components are added is not limited. For example, a metal catalyst can be dissolved in a solvent first, obtaining a metal-catalyst-containing solution. Next, a solution including the first monomer and α-olefin is mixed with the metal-catalyst-containing solution. Finally, the second monomer is added into the above mixture. According to embodiments of the disclosure, the molar ratio of the first monomer to the second monomer can be from about 100:0 (i.e. there is no the second monomer added) to 1:99, such as from about 9:1 to 1:9, from about 8:2 to 2:8, from about 3:7 to 7:3, or from about 3:7 to 6:4. In addition, the molar percentage of α-olefin can be from about 1 mol % to 85 mol %, such as about from 5 mol % to 75 mol %, or about from 10 mol % to 75 mol %, based on the total moles of the first monomer and the second monomer.

In one embodiment, the amount of the α-olefin is inversely proportional to the molecular weight of the oligomer, so that the molecular weight of the oligomer can be controlled by means of the amount of α-olefin. When the molar percentage of α-olefin is too low, the oligomer would have relatively high molecular weight and exhibit poor proccessability and storability. Conversely, when the molar percentage of α-olefin is too high, the oligomer would have a relatively low molecular weight and the process for preparing the substrate is not easy to control.

According to embodiments of the disclosure, the disclosure also provides a resin composition including the aforementioned oligomer, and one or at least one resin. The resin composition can include about 10-90 parts by weight of the oligomer, about 15-85 parts by weight of the oligomer, or about 20-80 parts by weight of the oligomer. Furthermore, the resin composition can include about 10-90 parts by weight of the resin, about 15-85 parts by weight of the resin, or about 20-80 parts by weight of the resin. According to embodiments of the disclosure, the aforementioned oligomer and the resin are 100 parts by weight in total. The resin can be polyolefin resin (such as polybutadiene resin), polyalkenamer resin, cyclic olefin polymer resin, cycloolefin copolymer resin, epoxy resin, cyanate resin, polystyrene resin, styrene-butadiene copolymer resin (such as polystyrene-butadiene-styrene resin), polyimide resin, maleimide resin, polyphenylene ether resin, or a combination thereof. In addition, According to embodiments of the disclosure, the weight percentage of the oligomer can be from about 1 wt % to 99 wt %, from about 10 wt % to 90 wt %, or from about 20 wt % to 80 wt %, and the weight percentage of the resin can be from about 1 wt % to 99 wt %, from about 10 wt % to 90 wt %, or from about 20 wt % to 80 wt %, based on the total weight of the oligomer and resin.

According to an embodiment of the disclosure, the disclosure also provides a composite material. The composite material can include a cured product or a semi-cured product of the resin composition, and a substrate. In particular, the cured product or semi-cured product is disposed on the substrate or within the substrate. According to an embodiment of the disclosure, the substrate can be a glass fiber, or a copper foil. For example, the composite material can include a prepreg, and the method for preparing the prepreg includes immersing a glass fiber (serving as the substrate) into the aforementioned resin composition. Next, the resin composition is subjected to a semi-curing process, obtaining the prepreg. In addition, the composite material can further include a copper foil, and the composite material can be a copper foil substrate, a printed circuit board, or an integrated circuit.

The inventive concept of the disclosure may be embodied in various forms without being limited to the exemplary embodiments set forth herein.

Example 1

0.045 g of 1,3-Bis(2,4,6-trimethylphenyl)-4,5-dihydroimidazol-2-ylidene[2-(i-propoxy)-5-(N,N-dimethylaminosulfonyl)phenyl]methyleneruthenium(II) dichloride (as metal catalyst) was added into a first reaction bottle under nitrogen atmosphere, and then 10 ml of toluene was added into the first reaction bottle, obtaining a metal-catalyst-containing solution. After the metal catalyst was dissolved in toluene completely, 0.604 mol of 1-hexene (as α-olefin), 73.6 g of vinyl norbornene, and 128 ml of toluene were added into a second reaction bottle. Next, the metal-catalyst-containing solution in the first reaction bottle was added into the second reaction bottle. After stirring completely, a norbornene-containing solution (57.7 g of norbornene (NB) dissolved in 50 ml of toluene) was added into the second reaction bottle. Herein, α-olefin (1-hexene) had a molar percentage of 50 mol %, based on the total moles of vinyl norbornene and norbornene. After the reaction was complete, 63 ml of ethyl vinyl ether was added into the second reaction bottle. After stirring overnight, the catalyst of the result was removed and then was purified by a reprecipitation with methanol. After concentration, Copolymer (I) was obtained, wherein the ratio of the repeat unit

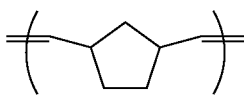

to the repeat unit

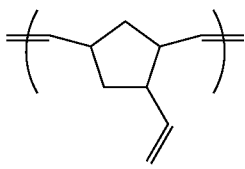

of Copolymer (I) was about 1:1.

Next, the number average molecular weight (Mn), the polydispersity index (PDI), the solubility (in toluene), and the temperature corresponding to a thermogravimetric analysis (TGA) weight loss of 5% of Copolymer (I) were determined, and the results are shown in Table 1.

Example 2

0.045 g of 1,3-Bis(2,4,6-trimethylphenyl)-4,5-dihydroimidazol-2-ylidene[2-(i-propoxy)-5-(N,N-dimethylaminosulfonyl)phenyl]methyleneruthenium(II) dichloride (as metal catalyst) was added into a first reaction bottle under nitrogen atmosphere, and then 10 ml of toluene was added into the first reaction bottle, obtaining a metal-catalyst-containing solution. After the metal catalyst was dissolved in toluene completely, 0.362 mol of 1-hexene (α-olefin), 73.6 g of vinyl norbornene, and 128 ml of toluene were added into a second reaction bottle. Next, the metal-catalyst-containing solution in the first reaction bottle was added into the second reaction bottle. After stirring completely, a norbornene-containing solution (57.7 g of norbornene dissolved in 50 ml of toluene) was added into the second reaction bottle. Herein, α-olefin (1-hexene) had a molar percentage of 30 mol %, based on the total moles of vinyl norbornene and norbornene. After the reaction was complete, 63 ml of ethyl vinyl ether was added into the second reaction bottle. After stirring overnight, the catalyst of the result was removed and then was purified by a reprecipitation with methanol. After concentration, Copolymer (II) was obtained, wherein the ratio of the repeat unit

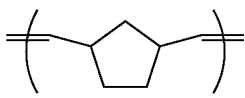

to the repeat unit

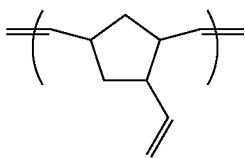

of Copolymer (II) was about 1:1.

Next, the number average molecular weight (Mn), the polydispersity index (PDI), the solubility (in toluene), and the temperature corresponding to a thermogravimetric analysis (TGA) weight loss of 5% of Copolymer (II) were determined, and the results are shown in Table 1.

Example 3

0.09 g of 1,3-Bis(2,4,6-trimethylphenyl)-4,5-dihydroimidazol-2-ylidene[2-(i-propoxy)-5-(N,N-dimethylaminosulfonyl)phenyl]methyleneruthenium(II) dichloride (as metal catalyst) was added into a first reaction bottle under nitrogen atmosphere, and then 15 ml of toluene was added into the first reaction bottle, obtaining a metal-catalyst-containing solution. After the metal catalyst was dissolved in toluene completely, 0.483 mol of 1-hexene (α-olefin), 147 g of vinyl norbornene, and 260 ml of toluene were added into a second reaction bottle. Next, the metal-catalyst-containing solution in the first reaction bottle was added into the second reaction bottle. After stirring completely, a norbornene-containing solution (115 g of norbornene dissolved in 100 ml of toluene) was added into the second reaction bottle. Herein, α-olefin (1-hexene) had a molar percentage of 20 mol %, based on the total moles of vinyl norbornene and norbornene. After the reaction was complete, 125 ml of ethyl vinyl ether was added into the second reaction bottle. After stirring overnight, the catalyst of the result was removed and then was purified by a reprecipitation with methanol. After concentration, Copolymer (III) was obtained, wherein the ratio of the repeat unit

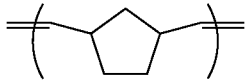

to the repeat unit

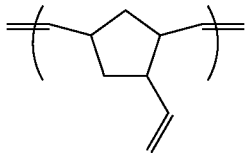

of Copolymer (III) was about 1:1.

Next, the number average molecular weight (Mn), the polydispersity index (PDI), the solubility (in toluene), and the temperature corresponding to a thermogravimetric analysis (TGA) weight loss of 5% of Copolymer (III) were determined, and the results are shown in Table 1.

Example 4

0.045 g of 1,3-Bis(2,4,6-trimethylphenyl)-4,5-dihydroimidazol-2-ylidene[2-(i-propoxy)-5-(N,N-dimethylaminosulfonyl)phenyl]methyleneruthenium(II) dichloride (as metal catalyst) was added into a first reaction bottle under nitrogen atmosphere, and then 10 ml of toluene was added into the first reaction bottle, obtaining a metal-catalyst-containing solution. After the metal catalyst was dissolved in toluene completely, 0.241 mol of 1-hexene (α-olefin), 52.1 g of vinyl norbornene, and 87 ml of toluene were added into a second reaction bottle. Next, the metal-catalyst-containing solution in the first reaction bottle was added into the second reaction bottle. After stirring completely, a norbornene-containing solution (75 g of norbornene dissolved in 90 ml of toluene) was added into the second reaction bottle. Herein, α-olefin (1-hexene) had a molar percentage of 20 mol %, based on the total moles of vinyl norbornene and norbornene. After the reaction was complete, 63 ml of ethyl vinyl ether was added into the second reaction bottle. After stirring overnight, the catalyst of the result was removed and then was purified by a reprecipitation with methanol. After concentration, Copolymer (IV) was obtained, wherein the ratio of the repeat unit

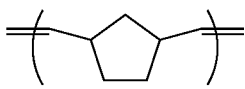

to the repeat unit of Copolymer (IV) was about 1:0.5.

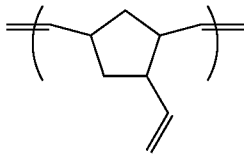

Next, the number average molecular weight (Mn), the polydispersity index (PDI), the solubility (in toluene), and the temperature corresponding to a thermogravimetric analysis (TGA) weight loss of 5% of Copolymer (IV) were determined, and the results are shown in Table 1.

Example 5

0.054 g of 1,3-Bis(2,4,6-trimethylphenyl)-4,5-dihydroimidazol-2-ylidene[2-(i-propoxy)-5-(N,N-dimethylaminosulfonyl)phenyl]methyleneruthenium(II) dichloride (as metal catalyst) was added into a first reaction bottle under nitrogen atmosphere, and then 15 ml of toluene was added into the first reaction bottle, obtaining a metal-catalyst-containing solution. After the metal catalyst was dissolved in toluene completely, 0.145 mol of 1-hexene (α-olefin), 88.3 g of vinyl norbornene, and 150 ml of toluene were added into a second reaction bottle. Next, the metal-catalyst-containing solution in the first reaction bottle was added into the second reaction bottle. After stirring completely, a norbornene-containing solution (69.3 g of norbornene dissolved in 60 ml of toluene) was added into the second reaction bottle. Herein, α-olefin (1-hexene) had a molar percentage of 10 mol %, based on the total moles of vinyl norbornene and norbornene. After the reaction was complete, 75 ml of ethyl vinyl ether was added into the second reaction bottle. After stirring overnight, the catalyst of the result was removed and then was purified by a reprecipitation with methanol. After concentration, Copolymer (V) was obtained, wherein the ratio of the repeat unit

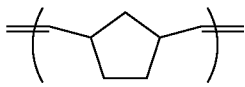

to the repeat unit

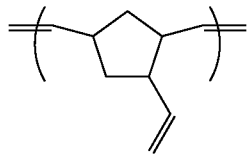

of Copolymer (V) was about 1:1.

Next, the number average molecular weight (Mn), the polydispersity index (PDI), the solubility (in toluene), and the temperature corresponding to a thermogravimetric analysis (TGA) weight loss of 5% of Copolymer (V) were determined, and the results are shown in Table 1.

Example 6

0.018 g of 1,3-Bis(2,4,6-trimethylphenyl)-4,5-dihydroimidazol-2-ylidene[2-(i-propoxy)-5-(N,N-dimethylaminosulfonyl)phenyl]methyleneruthenium(II) dichloride (as metal catalyst) was added into a first reaction bottle under nitrogen atmosphere, and then 10 ml of toluene was added into the first reaction bottle, obtaining a metal-catalyst-containing solution. After the metal catalyst was dissolved in toluene completely, 0.0245 mol of 1-hexene (α-olefin), 29.4 g of vinyl norbornene, and 45 ml of toluene were added into a second reaction bottle. Next, the metal-catalyst-containing solution in the first reaction bottle was added into the second reaction bottle. After stirring completely, a norbornene-containing solution (23.06 g of norbornene dissolved in 20 ml of toluene) was added into the second reaction bottle. Herein, α-olefin (1-hexene) had a molar percentage of 5 mol %, based on the total moles of vinyl norbornene and norbornene. After the reaction was complete, 25 ml of ethyl vinyl ether was added into the second reaction bottle. After stirring overnight, the catalyst of the result was removed and then was purified by a reprecipitation with methanol. After concentration, Copolymer (VI) was obtained, wherein the ratio of the repeat unit

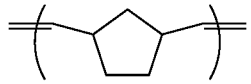

to the repeat unit

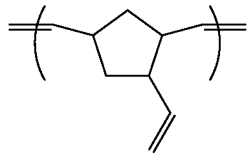

of Copolymer (VI) was about 1:1.

Next, the number average molecular weight (Mn), the polydispersity index (PDI), the solubility (in toluene), and the temperature corresponding to a thermogravimetric analysis (TGA) weight loss of 5% of Copolymer (VI) were determined, and the results are shown in Table 1.

Example 7

0.009 g of 1,3-Bis(2,4,6-trimethylphenyl)-4,5-dihydroimidazol-2-ylidene[2-(i-propoxy)-5-(N,N-dimethylaminosulfonyl)phenyl]methyleneruthenium(II) dichloride (as metal catalyst) was added into a first reaction bottle under nitrogen atmosphere, 6 ml of toluene was added into the first reaction bottle, obtaining a metal-catalyst-containing solution. After the metal catalyst was dissolved in toluene completely, 0.0073 mol of 1-hexene (α-olefin), 14.7 g of vinyl norbornene, and 23 ml of toluene were added into a second reaction bottle. Next, the metal-catalyst-containing solution in the first reaction bottle was added into the second reaction bottle. After stirring completely, a norbornene-containing solution (11.5 g of norbornene dissolved in 10 ml of toluene) was added into the second reaction bottle. Herein, α-olefin (1-hexene) had a molar percentage of 3 mol %, based on the total moles of vinyl norbornene and norbornene. After the reaction was complete, 13 ml of ethyl vinyl ether was added into the second reaction bottle. After stirring overnight, the catalyst of the result was removed and then was purified by a reprecipitation with methanol. After concentration, Copolymer (VII) was obtained, wherein the ratio of the repeat unit

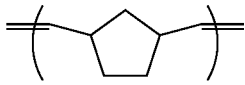

to the repeat unit

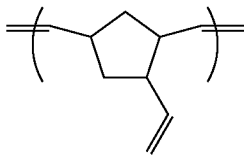

of Copolymer (VII) was about 1:1.

Next, the number average molecular weight (Mn), the polydispersity index (PDI), the solubility (in toluene), and the temperature corresponding to a thermogravimetric analysis (TGA) weight loss of 5% of Copolymer (VII) were determined, and the results are shown in Table 1.

Example 8

0.054 g of 1,3-Bis(2,4,6-trimethylphenyl)-4,5-dihydroimidazol-2-ylidene[2-(i-propoxy)-5-(N,N-dimethylaminosulfonyl)phenyl]methyleneruthenium(II) dichloride (as metal catalyst) was added into a first reaction bottle under nitrogen atmosphere, 30 ml of toluene was added into the first reaction bottle, obtaining a metal-catalyst-containing solution. After the metal catalyst was dissolved in toluene completely, 0.725 mol of 1-hexene (α-olefin), 177 g of vinyl norbornene, and 300 ml of toluene were added into a second reaction bottle. Next, the metal-catalyst-containing solution in the first reaction bottle was added into the second reaction bottle. Herein, α-olefin (1-hexene) had a molar percentage of 50 mol %, based on the mole of vinyl norbornene. After the reaction was complete, 75 ml of ethyl vinyl ether was added into the second reaction bottle. After stirring overnight, the catalyst of the result was removed and then was purified by a reprecipitation with methanol. After concentration, Copolymer (VIII) was obtained, wherein the only repeat unit of Copolymer (VIII) was

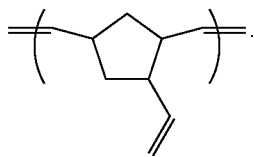

Next, the number average molecular weight (Mn), the polydispersity index (PDI), the solubility (in toluene), and the temperature corresponding to a thermogravimetric analysis (TGA) weight loss of 5% of Copolymer (VIII) were determined, and the results are shown in Table 1.

Example 9

0.0018 g of 1,3-Bis(2,4,6-trimethylphenyl)-4,5-dihydroimidazol-2-ylidene[2-(i-propoxy)-5-(N,N-dimethylaminosulfonyl)phenyl]methyleneruthenium(II) dichloride (as metal catalyst) was added into a first reaction bottle under nitrogen atmosphere, 1 ml of toluene was added into the first reaction bottle, obtaining a metal-catalyst-containing solution. After the metal catalyst was dissolved in toluene completely, 0.0005 mol of 1-hexene (α-olefin), 3 g of vinyl norbornene, and 4.5 ml of toluene were added into a second reaction bottle. Next, the metal-catalyst-containing solution in the first reaction bottle was added into the second reaction bottle. After stirring completely, a norbornene-containing solution (2.36 g of norbornene dissolved in 2 ml of toluene) was added into the second reaction bottle. Herein, α-olefin (1-hexene) had a molar percentage of 1 mol %, based on the total moles of vinyl norbornene and norbornene. After the reaction was complete, 2.5 ml of ethyl vinyl ether was added into the second reaction bottle. After stirring overnight, the catalyst of the result was removed and then was purified by a reprecipitation with methanol. After concentration, Copolymer (IX) was obtained, wherein the ratio of the repeat unit

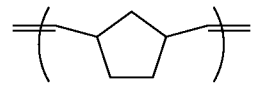

to the repeat unit

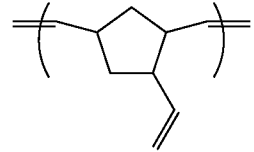

of Copolymer (IX) was about 1:1.

Next, the number average molecular weight (Mn), the polydispersity index (PDI), the solubility (in toluene), and the temperature corresponding to a thermogravimetric analysis (TGA) weight loss of 5% of Copolymer (IX) were determined, and the results are shown in Table 1.

Comparative Example 1

0.018 g of 1,3-Bis(2,4,6-trimethylphenyl)-4,5-dihydroimidazol-2-ylidene[2-(i-propoxy)-5-(N,N-dimethylaminosulfonyl)phenyl]methyleneruthenium(II) dichloride (as metal catalyst) was added into a first reaction bottle under nitrogen atmosphere, and then 10 ml of toluene was added into the first reaction bottle, obtaining a metal-catalyst-containing solution. After the metal catalyst was dissolved in toluene completely, 0.245 mol of methylacrylate (α-olefin), 29.4 g of vinyl norbornene, and 45 ml of toluene were added into a second reaction bottle. Next, the metal-catalyst-containing solution in the first reaction bottle was added into the second reaction bottle. After stirring completely, a norbornene-containing solution (23.06 g of norbornene dissolved in 20 ml of toluene) was added into the second reaction bottle. Herein, methylacrylate had a molar percentage of 50 mol %, based on the total moles of vinyl norbornene and norbornene. After the reaction was complete, 25 ml of ethyl vinyl ether was added into the second reaction bottle. After stirring overnight, the catalyst of the result was removed and then was purified by a reprecipitation with methanol. After concentration, Copolymer (X) was obtained, wherein the ratio of the repeat unit

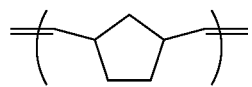

to the repeat unit

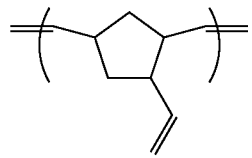

of Copolymer (X) was about 1:1.

toluene completely, 29.4 g of vinyl norbornene, and 35 ml of toluene were added into a second reaction bottle. Next, the metal-catalyst-containing solution in the first reaction bottle was added into the second reaction bottle. After stirring completely, a norbornene-containing solution (23.06 g of norbornene dissolved in 20 ml of toluene) was added into the second reaction bottle. After the reaction was complete, 25 ml of ethyl vinyl ether was added into the second reaction bottle. After stirring overnight, the catalyst of the result was removed and then was purified by a reprecipitation with methanol. After concentration, Copolymer (XI) was obtained, wherein the ratio of the repeat unit

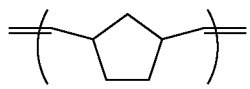

to the repeat unit

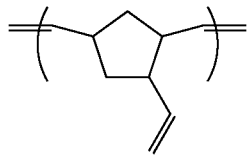

of Copolymer (XI) was about 1:1.

Next, the number average molecular weight (Mn), the polydispersity index (PDI), the solubility (in toluene), and the temperature corresponding to a thermogravimetric analysis (TGA) weight loss of 5% of Copolymer (XI) were determined, and the results are shown in Table 1.

TABLE 1

|  | Example 1 | Example 2 | Example 3 | Example 4 | Example 5 | Example 6 | Example 7 | Example 8 | Example 9 | Comparative Example 1 | Comparative Example 2 |
| --- | --- | --- | --- | --- | --- | --- | --- | --- | --- | --- | --- |
| VNB(g) | 73.6 | 73.6 | 147 | 52.1 | 88.3 | 29.4 | 14.7 | 177 | 3 | 29.4 | 29.4 |
| NB(g) | 57.7 | 57.7 | 115 | 75.0 | 69.3 | 23.06 | 11.5 | 0 | 2.36 | 23.06 | 23.06 |
| α-olefin | 1-hexene | 1-hexene | 1-hexene | 1-hexene | 1-hexene | 1-hexene | 1-hexene | 1-hexene | 1-hexene | methylacrylate | — |
| α-olefin (mol %) | 50 | 30 | 20 | 20 | 10 | 5 | 3 | 50 | 1 | 50 | 0 |
| Number average molecular weight (Mn) | 1,033 | 1,433 | 1,939 | 1,683 | 3,089 | 4,916 | 5,291 | 1,225 | 11,017 | 19,402 | 33,488 |
| Solubility (wt %) | >70 | >70 | >70 | >70 | >60 | >60 | >40 | >70 | 20 | <10 | <10 |

Next, the number average molecular weight (Mn), the polydispersity index (PDI), the solubility (in toluene), and the temperature corresponding to a thermogravimetric analysis (TGA) weight loss of 5% of Copolymer (X) were determined, and the results are shown in Table 1.

Comparative Example 2

0.018 g of 1,3-Bis(2,4,6-trimethylphenyl)-4,5-dihydroimidazol-2-ylidene[2-(i-propoxy)-5-(N,N-dimethylaminosulfonyl)phenyl]methyleneruthenium(II) dichloride (as metal catalyst) was added into a first reaction bottle under nitrogen atmosphere, and then 10 ml of toluene was added into the first reaction bottle, obtaining a metal-catalyst-containing solution. After the metal catalyst was dissolved in In order to meet the processing requirements for subsequently forming the film of the disclosure, the solubility of the oligomer of the disclosure in toluene should be greater or equal to 20 wt %. As shown in Table 1, when the copolymer prepared by copolymerizing vinyl norbornene, norbornene and 1-hexene (α-olefin) (i.e. the oligomer of the disclosure) has a molecular weight less than or equal to 12,000, the solubility of the oligomer of the disclosure in toluene can meet the processing requirements for subsequently forming the film of the disclosure.

Example 10

0.018 g of 1,3-Bis(2,4,6-trimethylphenyl)-4,5-dihydroimidazol-2-ylidene[2-(i-propoxy)-5-(N,N-dimethylaminosulfonyl)phenyl]methyleneruthenium(II) dichloride (as metal catalyst) was added into a first reaction bottle under nitrogen atmosphere, and then 10 ml of toluene was added into the first reaction bottle, obtaining a metal-catalyst-containing solution. After the metal catalyst was dissolved in toluene completely, 0.247 mol of 1-octadecene (α-olefin), 29.4 g of vinyl norbornene, and 45 ml of toluene were added into a second reaction bottle, obtaining a metal-catalyst-containing solution. Next, the metal-catalyst-containing solution in the first reaction bottle was added into the second reaction bottle. After stirring completely, a norbornene-containing solution (23.06 g of norbornene dissolved in 20 ml of toluene) was added into the second reaction bottle. Herein, α-olefin (1-octadecene) had a molar percentage of 50 mol %, based on the total moles of vinyl norbornene and norbornene. After the reaction was complete, 25 ml of ethyl vinyl ether was added into the second reaction bottle. After stirring overnight, the catalyst of the result was removed and then was purified by a reprecipitation with methanol. After concentration, Copolymer (XII) was obtained.

Next, the number average molecular weight (Mn), the polydispersity index (PDI), the solubility (in toluene), and the temperature corresponding to a thermogravimetric analysis (TGA) weight loss of 5% of Copolymer (XII) were determined, and the results are shown in Table 2.

Example 11

Example 11 was performed in the same manner as Example 10 except that the amount of 1-octadecene was reduced from 0.247 mol to 0.049 mol, obtaining Copolymer (XIII). The number average molecular weight (Mn), the polydispersity index (PDI), the solubility (in toluene), and the temperature corresponding to a thermogravimetric analysis (TGA) weight loss of 5% of Copolymer (XIII) were determined, and the results are shown in Table 2.

Example 12

Example 12 was performed in the same manner as Example 10 except that the 1-octadecene was replaced with styrene, obtaining Copolymer (XIV). The number average molecular weight (Mn), the polydispersity index (PDI), the solubility (in toluene), and the temperature corresponding to a thermogravimetric analysis (TGA) weight loss of 5% of Copolymer (XIV) were determined, and the results are shown in Table 2.

Example 13

0.006 g of 1,3-Bis(2,4,6-trimethylphenyl)-4,5-dihydroimidazol-2-ylidene[2-(i-propoxy)-5-(N,N-dimethylaminosulfonyl)phenyl]methyleneruthenium(II) dichloride (as metal catalyst) was added into a first reaction bottle under nitrogen atmosphere, and then 4 ml of toluene was added into the first reaction bottle, obtaining a metal-catalyst-containing solution. After the metal catalyst was dissolved in toluene completely, 0.008 mol of vinylcyclohexene (α-olefin), 9.8 g of vinyl norbornene, and 15 ml of toluene were added into a second reaction bottle. Next, the metal-catalyst-containing solution in the first reaction bottle was added into the second reaction bottle. After stirring completely, a norbornene-containing solution (7.69 g of norbornene dissolved in 7 ml of toluene) was added into the second reaction bottle. Herein, α-olefin (vinylcyclohexene) had a molar percentage of 5 mol %, based on the total moles of vinyl norbornene and norbornene. After the reaction was complete, 8 ml of ethyl vinyl ether was added into the second reaction bottle. After stirring overnight, the catalyst of the result was removed and then was purified by a reprecipitation with methanol. After concentration, Copolymer (XV) was obtained.

Next, the number average molecular weight (Mn), the polydispersity index (PDI), the solubility (in toluene), and the temperature corresponding to a thermogravimetric analysis (TGA) weight loss of 5% of Copolymer (XV) were determined, and the results are shown in Table 2.

Example 14

0.0018 g of 1,3-Bis(2,4,6-trimethylphenyl)-4,5-dihydroimidazol-2-ylidene[2-(i-propoxy)-5-(N,N-dimethylaminosulfonyl)phenyl]methyleneruthenium(II) dichloride (as metal catalyst) was added into a first reaction bottle under nitrogen atmosphere, and then 0.5 ml of toluene was added into the first reaction bottle, obtaining a metal-catalyst-containing solution. After the metal catalyst was dissolved in toluene completely, 0.043 mol of methylacrylate (α-olefin), 3 g of vinyl norbornene, and 4.5 ml of toluene were added into a second reaction bottle. Next, the metal-catalyst-containing solution in the first reaction bottle was added into the second reaction bottle. Herein, methylacrylate had a molar percentage of 85 mol %, based on the total moles of vinyl norbornene and norbornene. After the reaction was complete, 2.5 ml of ethyl vinyl ether was added into the second reaction bottle. After stirring overnight, the catalyst of the result was removed and then was purified by a reprecipitation with methanol. After concentration, Copolymer (XVI) was obtained.

Next, the number average molecular weight (Mn), the polydispersity index (PDI), the solubility (in toluene), and the temperature corresponding to a thermogravimetric analysis (TGA) weight loss of 5% of Copolymer (XVI) were determined, and the results are shown in Table 2.

Example 15

Example 15 was performed in the same manner as Example 10 except that the 1-octadecene was replaced with allyl acetate, obtaining Copolymer (XVII). The number average molecular weight (Mn), the polydispersity index (PDI), the solubility (in toluene), and the temperature corresponding to a thermogravimetric analysis (TGA) weight loss of 5% of Copolymer (XVII) were determined, and the results are shown in Table 2.

Example 16

Example 16 was performed in the same manner as Example 10 except that the 1-octadecene was replaced with 1,5-hexadiene, obtaining Copolymer (XVIII). The number average molecular weight (Mn), the polydispersity index (PDI), the solubility (in toluene), and the temperature corresponding to a thermogravimetric analysis (TGA) weight loss of 5% of Copolymer (XVIII) were determined, and the results are shown in Table 2.

TABLE 2

|  | Example 10 | Example 11 | Example 12 | Example 13 | Example 14 | Example 15 | Example 16 |
|---|---|---|---|---|---|---|---|
| VNB(g) | 29.4 | 29.4 | 29.4 | 9.8 | 3 | 29.4 | 29.4 |
| NB(g) | 23.06 | 23.06 | 23.06 | 7.69 | 2.36 | 23.06 | 23.06 |
| α-olefin | 1-octadecene | 1-octadecene | styrene | vinylcyclohexene | methylacrylate | allyl acetate | 1,5-hexadiene |
| α-olefin (mol %) | 50 | 10 | 50 | 5 | 85 | 50 | 50 |
| Number average molecular weight (Mn) | 871 | 2,736 | 1,936 | 1,988 | 3,699 | 2,779 | 1,072 |
| Solubility (wt %) | >70 | >70 | >70 | >70 | >50 | >70 | >70 |

As shown in Table 2, with copolymerization of vinyl norbornene and norbornene, 1-hexene (α-olefin) can be replaced with 1-octadecene, styrene, vinylcyclohexene, methylacrylate, 1,5-hexadiene, or allyl acetate. Therefore, the solubility of the obtained copolymer having a number average molecular weight less than or equal to 12,000 (i.e. the oligomer of the disclosure) in toluene can also meet the requirements of the subsequent coating (or immersion) process.

Test of Storability

The copolymers prepared from Examples 1-6 and 9-16 and Comparative Examples 1-2 were kept for one day (or two days), and then the solubility (in toluene) and viscosity of the copolymer were measured. The results are shown in Table 3.

TABLE 3

|  |  | Example 1 | Example 2 | Example 3 | Example 5 | Example 6 | Example 9 | Example 10 |
|---|---|---|---|---|---|---|---|---|
| Solubility in toluene (wt %) | kept for one day | >70 | >70 | >70 | >60 | >60 | 20 | >70 |
|  | kept for 2 days | >70 | >70 | >70 | >60 | >60 | >15 | >70 |
| Viscosity (cP) |  | 100 | 534 | 11,260 | 376,200 | 2,754 | solid | 18 |

|  |  | Example 11 | Example 12 | Example 15 | Example 16 | Comparative Example 1 | Comparative Example 2 |
|---|---|---|---|---|---|---|---|
| Solubility in toluene (wt %) | kept for one day | >70 | >70 | >70 | >70 | <10 | <10 |
|  | kept for 2 days | >70 | >70 | >70 | >70 | <1 | insoluble |
| Viscosity (cP) |  | 2,869 | 11,260 | 52,140 | 78 | solid | solid |

As shown in Table 3, the copolymers, prepared by copolymerizing vinyl norbornene, norbornene and α-olefin, having a molecular weight less than or equal to 12,000 (i.e. the oligomer of the disclosure) exhibit superior solubility after two days. Accordingly, the oligomer of the disclosure exhibits superior storability.

Resin Composition and Properties Measurement of Cured Product Thereof

Example 17

Copolymer (I) (40 parts by weight) of Example 1, polyphenylene ether (PPE, manufactured and sold by SABIC with a trade No. of SA9000 (with a molecular weight of about 2,300) (60 parts by weight), and an initiator (1 part by weight) were added into a reaction bottle, and then dissolved in toluene (60 parts by weight). After mixing completely, a resin composition was obtained. Next, the aforementioned resin composition was coated on a copper foil (manufactured and sold by Furukawa Circuit Foil Co., Ltd.). Next, the copper foil coated with the resin composition was heated at 100° C. for a period of time. Next, the above copper foil was then heated gradually and then the resin composition was subjected to a crosslinking reaction under a temperature lower than 250° C. (in order to achieve the best crosslinking density), obtaining Film (I). Next, the dielectric constant (Dk) and the dissipation factor (Df) of Film (I) were measured at 10 GHz, and the results are shown in Table 4.

Example 18

Example 18 was performed in the same manner as Example 17 except that Copolymer (I) of Example 1 was replaced with Copolymer (III) of Example 3, obtaining Film (II). Next, the dielectric constant (Dk) and the dissipation factor (Df) of Film (II) were measured at 10 GHz, and the results are shown in Table 4.

Example 19

Example 19 was performed in the same manner as Example 17 except that Copolymer (I) of Example 1 was replaced with Copolymer (IV) of Example 4, obtaining Film (III). Next, the dielectric constant (Dk) and the dissipation factor (Df) of Film (III) were measured at 10 GHz, and the results are shown in Table 4.

Example 20

Example 20 was performed in the same manner as Example 17 except that Copolymer (I) of Example 1 was replaced with Copolymer (V) of Example 5, obtaining Film (IV). Next, the dielectric constant (Dk) and the dissipation factor (Df) of Film (IV) were measured at 10 GHz, and the results are shown in Table 4.

Example 21

Example 21 was performed in the same manner as Example 17 except that Copolymer (I) of Example 1 was replaced with Copolymer (VI) of Example 6, obtaining Film (V). Next, the dielectric constant (Dk) and the dissipation factor (Df) of Film (V) were measured at 10 GHz, and the results are shown in Table 4.

Example 22

Example 22 was performed in the same manner as Example 17 except that Copolymer (I) of Example 1 was replaced with Copolymer (VIII) of Example 8, obtaining Film (VI). Next, the dielectric constant (Dk) and the dissipation factor (Df) of Film (VI) were measured at 10 GHz, and the results are shown in Table 4.

Example 23

Example 23 was performed in the same manner as Example 17 except that Copolymer (I) of Example 1 was replaced with Copolymer (IX) of Example 9, obtaining Film (VII). Next, the dielectric constant (Dk) and the dissipation factor (Df) of Film (VII) were measured at 10 GHz, and the results are shown in Table 4.

Example 24

Example 24 was performed in the same manner as Example 17 except that Copolymer (I) of Example 1 was replaced with Copolymer (XII) of Example 10, obtaining Film (VIII). Next, the dielectric constant (Dk) and the dissipation factor (Df) of Film (VIII) were measured at 10 GHz, and the results are shown in Table 4.

Example 25

Example 25 was performed in the same manner as Example 17 except that Copolymer (I) of Example 1 was replaced with Copolymer (XIII) of Example 11, obtaining Film (IX). Next, the dielectric constant (Dk) and the dissipation factor (Df) of Film (IX) were measured at 10 GHz, and the results are shown in Table 4.

Example 26

Example 26 was performed in the same manner as Example 17 except that Copolymer (I) of Example 1 was replaced with Copolymer (XIV) of Example 12, obtaining Film (X). Next, the dielectric constant (Dk) and the dissipation factor (Df) of Film (X) were measured at 10 GHz, and the results are shown in Table 4.

Example 27

Example 27 was performed in the same manner as Example 17 except that Copolymer (I) of Example 1 was replaced with Copolymer (XV) of Example 13, obtaining Film (XI). Next, the dielectric constant (Dk) and the dissipation factor (Df) of Film (XI) were measured at 10 GHz, and the results are shown in Table 4.

Example 28

Example 28 was performed in the same manner as Example 17 except that Copolymer (I) of Example 1 was replaced with Copolymer (XVI) of Example 14, obtaining Film (XII). Next, the dielectric constant (Dk) and the dissipation factor (Df) of Film (XII) were measured at 10 GHz, and the results are shown in Table 4.

Example 29

Example 29 was performed in the same manner as Example 17 except that Copolymer (I) of Example 1 was replaced with Copolymer (XVII) of Example 15, obtaining Film (XIII). Next, the dielectric constant (Dk) and the dissipation factor (Df) of Film (XIII) were measured at 10 GHz, and the results are shown in Table 4.

Example 30

Example 30 was performed in the same manner as Example 17 except that Copolymer (I) of Example 1 was replaced with Copolymer (XVIII) of Example 16, obtaining Film (XIV). Next, the dielectric constant (Dk) and the dissipation factor (Df) of Film (XIV) were measured at 10 GHz, and the results are shown in Table 4.

Comparative Example 3

1,3,5-tri-2-propenyl-1,3,5-triazine-2,4,6(1H,3H,5H)-trione (TAIC) (40 parts by weight), polyphenylene ether (PPE, manufactured and sold by SABIC with a trade No. of SA9000 (with a molecular weight of about 2,300) (60 parts by weight), and an initiator (1 part by weight) were added into a reaction bottle, and then dissolved in toluene (50 parts by weight). After mixing completely, a resin composition was obtained. Next, the aforementioned resin composition was coated on a copper foil (manufactured and sold by Furukawa Circuit Foil Co., Ltd.). Next, the copper foil coated with the resin composition was heated at 100° C. for a period of time. Next, the above copper foil was then heated gradually and then the resin composition was subjected to a crosslinking reaction under a temperature lower than 250° C. (in order to achieve the best crosslinking density), obtaining Film (XV). Next, the dielectric constant (Dk) and the dissipation factor (Df) of Film (XV) were measured at 10 GHz, and the results are shown in Table 4.

TABLE 4

|  | Components of resin composition | | Dielectric constant (10 GHz) | Dissipation factor (10 GHz) |
|---|---|---|---|---|
| Example 17 | 40 wt % Copolymer (I) | 60 wt % PPE | 2.49 | 0.0019 |
| Example 18 | 40 wt % Copolymer (III) | 60 wt % PPE | 2.39 | 0.0022 |
| Example 19 | 40 wt % Copolymer (IV) | 60 wt % PPE | 2.46 | 0.0023 |
| Example 20 | 40 wt % Copolymer (V) | 60 wt % PPE | 2.46 | 0.0022 |
| Example 21 | 40 wt % Copolymer (VI) | 60 wt % PPE | 2.43 | 0.0023 |
| Example 22 | 40 wt % Copolymer (VIII) | 60 wt % PPE | 2.47 | 0.0028 |
| Example 23 | 40 wt % Copolymer (IX) | 60 wt % PPE | 2.46 | 0.0023 |
| Example 24 | 40 wt % Copolymer (XII) | 60 wt % PPE | 2.34 | 0.0016 |
| Example 25 | 40 wt % Copolymer (XIII) | 60 wt % PPE | 2.44 | 0.0021 |
| Example 26 | 40 wt % Copolymer (XIV) | 60 wt % PPE | 2.45 | 0.0018 |
| Example 27 | 40 wt % Copolymer (XV) | 60 wt % PPE | 2.41 | 0.0028 |
| Example 28 | 40 wt % Copolymer (XVI) | 60 wt % PPE | 2.45 | 0.0025 |
| Example 29 | 40 wt % Copolymer (XVII) | 60 wt % PPE | 2.48 | 0.0030 |
| Example 30 | 40 wt % Copolymer (XVIII) | 60 wt % PPE | 2.51 | 0.0018 |
| Comparative Example 3 | 40 wt % TAIC | 60 wt % PPE | 2.66 | 0.0048 |

Example 31

Copolymer (I) (31 parts by weight) of Example 1, polyphenylene ether (PPE, manufactured and sold by SABIC with a trade No. of SA9000 (with a molecular weight of about 2,300) (46 parts by weight), polystyrene-butadiene-styrene (SBS, manufactured by Cray Valley with a trade No. of Ricon100) (with a molecular weight of about 4,500) (23 parts by weight) and an initiator (1 part by weight) were added into a reaction bottle, and then dissolved in toluene (60 parts by weight). After mixing completely, a resin composition was obtained. Next, the aforementioned resin composition was coated on a copper foil (manufactured and sold by Furukawa Circuit Foil Co., Ltd.). Next, the copper foil coated with the resin composition was heated at 100° C. for a period of time. Next, the above copper foil was then heated gradually and then the resin composition was subjected to a crosslinking reaction under a temperature lower than 250° C. (in order to achieve the best crosslinking density), obtaining Film (XVI). Next, the dielectric constant (Dk) and the dissipation factor (Df) of Film (XVI) were measured at 10 GHz, and the results are shown in Table 5.

Example 32

Example 32 was performed in the same manner as Example 31 except that Copolymer (I) of Example 1 was replaced with Copolymer (III) of Example 3, obtaining Film (XVII). Next, the dielectric constant (Dk) and the dissipation factor (Df) of Film (XVII) were measured at 10 GHz, and the results are shown in Table 5.

Example 33

Example 33 was performed in the same manner as Example 31 except that Copolymer (I) of Example 1 was replaced with Copolymer (IV) of Example 4, obtaining Film (XVIII). Next, the dielectric constant (Dk) and the dissipation factor (Df) of Film (XVIII) were measured at 10 GHz, and the results are shown in Table 5.

Example 34

Example 34 was performed in the same manner as Example 31 except that Copolymer (I) of Example 1 was replaced with Copolymer (V) of Example 5, obtaining Film (XIX). Next, the dielectric constant (Dk) and the dissipation factor (Df) of Film (XIX) were measured at 10 GHz, and the results are shown in Table 5.

Example 35

Example 35 was performed in the same manner as Example 31 except that Copolymer (I) of Example 1 was replaced with Copolymer (VI) of Example 6, obtaining Film (XX). Next, the dielectric constant (Dk) and the dissipation factor (Df) of Film (XX) were measured at 10 GHz, and the results are shown in Table 5.

Example 36

Example 36 was performed in the same manner as Example 31 except that Copolymer (I) of Example 1 was replaced with Copolymer (VIII) of Example 8, obtaining Film (XXI). Next, the dielectric constant (Dk) and the dissipation factor (Df) of Film (XXI) were measured at 10 GHz, and the results are shown in Table 5.

Example 37

Example 37 was performed in the same manner as Example 31 except that Copolymer (I) of Example 1 was replaced with Copolymer (IX) of Example 9, obtaining Film (XXII). Next, the dielectric constant (Dk) and the dissipation factor (Df) of Film (XXII) were measured at 10 GHz, and the results are shown in Table 5.

Example 38

Example 38 was performed in the same manner as Example 31 except that Copolymer (I) of Example 1 was replaced with Copolymer (XII) of Example 10, obtaining Film (XXIII). Next, the dielectric constant (Dk) and the dissipation factor (Df) of Film (XXIII) were measured at 10 GHz, and the results are shown in Table 5.

Example 39

Example 39 was performed in the same manner as Example 31 except that Copolymer (I) of Example 1 was replaced with Copolymer (XIII) of Example 11, obtaining Film (XXIV). Next, the dielectric constant (Dk) and the dissipation factor (Df) of Film (XXIV) were measured at 10 GHz, and the results are shown in Table 5.

Example 40

Example 40 was performed in the same manner as Example 31 except that Copolymer (I) of Example 1 was replaced with Copolymer (XIV) of Example 12, obtaining Film (XXV). Next, the dielectric constant (Dk) and the dissipation factor (Df) of Film (XXV) were measured at 10 GHz, and the results are shown in Table 5.

Example 41

Example 41 was performed in the same manner as Example 31 except that Copolymer (I) of Example 1 was replaced with Copolymer (XV) of Example 13, obtaining Film (XXVI). Next, the dielectric constant (Dk) and the dissipation factor (Df) of Film (XXVI) were measured at 10 GHz, and the results are shown in Table 5.

Example 42

Example 42 was performed in the same manner as Example 31 except that Copolymer (I) of Example 1 was replaced with Copolymer (XVI) of Example 14, obtaining Film (XXVII). Next, the dielectric constant (Dk) and the dissipation factor (Df) of Film (XXVII) were measured at 10 GHz, and the results are shown in Table 5.

Example 43

Example 43 was performed in the same manner as Example 31 except that Copolymer (I) of Example 1 was replaced with Copolymer (XVII) of Example 15, obtaining Film (XXVIII). Next, the dielectric constant (Dk) and the dissipation factor (Df) of Film (XXVIII) were measured at 10 GHz, and the results are shown in Table 5.

Example 44

Example 44 was performed in the same manner as Example 31 except that Copolymer (I) of Example 1 was replaced with Copolymer (XVIII) of Example 16, obtaining Film (XXIX). Next, the dielectric constant (Dk) and the dissipation factor (Df) of Film (XXIX) were measured at 10 GHz, and the results are shown in Table 5.

Comparative Example 4

1,3,5-tri-2-propenyl-1,3,5-triazine-2,4,6(1H,3H,5H)-tri-one (TAIC) (31 parts by weight), polyphenylene ether (PPE, manufactured and sold by SABIC with a trade No. of SA9000 (with a molecular weight of about 2,300) (46 parts by weight), polystyrene-butadiene-styrene (SBS, manufactured by Cray Valley with a trade No. of Ricon100) (with a molecular weight of about 4,500) (23 parts by weight) and an initiator (1 part by weight) were added into a reaction bottle, and then dissolved in toluene (50 parts by weight). After mixing completely, a resin composition was obtained. Next, the aforementioned resin composition was coated on a copper foil (manufactured and sold by Furukawa Circuit Foil Co., Ltd.). Next, the copper foil coated with the resin composition was heated at 100° C. for a period of time. Next, the above copper foil was then heated gradually and then the resin composition was subjected to a crosslinking reaction under a temperature lower than 250° C. (in order to achieve the best crosslinking density), obtaining Film (XXX). Next, the dielectric constant (Dk) and the dissipation factor (Df) of Film (XXX) were measured at 10 GHz, and the results are shown in Table 5.

TABLE 5

| | Components of resin composition | | | Dielectric constant (10 GHz) | Dissipation factor (10 GHz) |
|---|---|---|---|---|---|
| Example 31 | 31 wt % Copolymer (I) | 23 wt % SBS | 46 wt % PPE | 2.32 | 0.0012 |
| Example 32 | 31 wt % Copolymer (III) | 23 wt % SBS | 46 wt % PPE | 2.42 | 0.0016 |
| Example 33 | 31 wt % Copolymer (IV) | 23 wt % SBS | 46 wt % PPE | 2.41 | 0.0015 |
| Example 34 | 31 wt % Copolymer (V) | 23 wt % SBS | 46 wt % PPE | 2.39 | 0.0018 |
| Example 35 | 31 wt % Copolymer (VI) | 23 wt % SBS | 46 wt % PPE | 2.30 | 0.0015 |
| Example 36 | 31 wt % Copolymer (VIII) | 23 wt % SBS | 46 wt % PPE | 2.42 | 0.0025 |
| Example 37 | 31 wt % Copolymer (IX) | 23 wt % SBS | 46 wt % PPE | 2.44 | 0.0019 |
| Example 38 | 31 wt % Copolymer (XII) | 23 wt % SBS | 46 wt % PPE | 2.34 | 0.0015 |
| Example 39 | 31 wt % Copolymer (XIII) | 23 wt % SBS | 46 wt % PPE | 2.38 | 0.0015 |
| Example 40 | 31 wt % Copolymer (XIV) | 23 wt % SBS | 46 wt % PPE | 2.37 | 0.0015 |
| Example 41 | 31 wt % Copolymer (XV) | 23 wt % SBS | 46 wt % PPE | 2.43 | 0.0022 |
| Example 42 | 31 wt % Copolymer (XVI) | 23 wt % SBS | 46 wt % PPE | 2.41 | 0.0021 |
| Example 43 | 31 wt % Copolymer (XVII) | 23 wt % SBS | 46 wt % PPE | 2.46 | 0.0023 |
| Example 44 | 31 wt % Copolymer (XVIII) | 23 wt % SBS | 46 wt % PPE | 2.47 | 0.0015 |
| Comparative Example 4 | 31 wt % TAIC | 23 wt % SBS | 46 wt % PPE | 2.61 | 0.0028 |

Example 45

Copolymer (III) (10 parts by weight) of Example 3, polyphenylene ether (PPE, manufactured and sold by SABIC with a trade No. of SA9000) (with a molecular weight of about 2,300) (90 parts by weight) and an initiator (1 part by weight) were added into a reaction bottle, and then dissolved in toluene (60 parts by weight). After mixing completely, a resin composition was obtained. Next, the aforementioned resin composition was coated on a copper foil (manufactured and sold by Furukawa Circuit Foil Co., Ltd.). Next, the copper foil coated with the resin composition was heated at 100° C. for a period of time. Next, the above copper foil was then heated gradually and then the resin composition was subjected to a crosslinking reaction under a temperature lower than 250° C. (in order to achieve the best crosslinking density), obtaining Film (XXXI). Next, the dielectric constant (Dk) and the dissipation factor (Df) of Film (XXXI) were measured at 10 GHz, and the results are shown in Table 6.

Example 46

Example 46 was performed in the same manner as Example 45 except that the weight of Copolymer (III) was increased from 10 parts by weight to 20 parts by weight and the weight of polyphenylene ether was reduced from 90 parts by weight to 80 parts by weight, obtaining Film (XXXII). Next, the dielectric constant (Dk) and the dissipation factor (Df) of Film (XXXII) were measured at 10 GHz, and the results are shown in Table 6.

Example 47

Example 47 was performed in the same manner as Example 45 except that the weight of Copolymer (III) was increased from 10 parts by weight to 80 parts by weight and the weight of polyphenylene ether was reduced from 90 parts by weight to 20 parts by weight, obtaining Film (XXXIII). Next, the dielectric constant (Dk) and the dissipation factor (Df) of Film (XXXIII) were measured at 10 GHz, and the results are shown in Table 6.

Example 48

Copolymer (I) (70 parts by weight) of Example 1, polystyrene-butadiene-styrene (SBS, manufactured by Cray Valley with a trade No. of Ricon100) (with a molecular weight of about 4,500) (30 parts by weight) and an initiator (1 part by weight) were added into a reaction bottle, and then dissolved in toluene (60 parts by weight). After mixing completely, a resin composition was obtained. Next, the aforementioned resin composition was coated on a copper foil (manufactured and sold by Furukawa Circuit Foil Co., Ltd.). Next, the copper foil coated with the resin composition was heated at 90° C. for a period of time. Next, the above copper foil was then heated gradually and then the resin composition was subjected to a crosslinking reaction under a temperature lower than 250° C. (in order to achieve the best crosslinking density), obtaining Film (XXXIV). Next, the dielectric constant (Dk) and the dissipation factor (Df) of Film (XXXIV) were measured at 10 GHz, and the results are shown in Table 6.

Example 49

Example 49 was performed in the same manner as Example 48 except that Copolymer (I) of Example 1 was replaced with Copolymer (VIII) of Example 8, obtaining Film (XXXV). Next, the dielectric constant (Dk) and the dissipation factor (Df) of Film (XXXV) were measured at 10 GHz, and the results are shown in Table 6.

Example 50

Example 50 was performed in the same manner as Example 45 except that polyphenylene ether was replaced with polystyrene-butadiene-styrene (SBS, manufactured by Cray Valley with a trade No. of Ricon100) (with a molecular weight of about 4,500), obtaining Film (XXXVI). Next, the dielectric constant (Dk) and the dissipation factor (Df) of Film (XXXVI) were measured at 10 GHz, and the results are shown in Table 6.

Example 51

Example 51 was performed in the same manner as Example 50 except that the weight of Copolymer (III) was increased from 10 parts by weight to 20 parts by weight and the weight of polystyrene-butadiene-styrene was reduced from 90 parts by weight to 80 parts by weight, obtaining Film (XXXVII). Next, the dielectric constant (Dk) and the dissipation factor (Df) of Film (XXXVII) were measured at 10 GHz, and the results are shown in Table 6.

Example 52

Example 52 was performed in the same manner as Example 50 except that the weight of Copolymer (III) was increased from 10 parts by weight to 50 parts by weight and the weight of polystyrene-butadiene-styrene was reduced from 90 parts by weight to 50 parts by weight, obtaining Film (XXXVIII). Next, the dielectric constant (Dk) and the dissipation factor (Df) of Film (XXXVIII) were measured at 10 GHz, and the results are shown in Table 6.

Example 53

Example 53 was performed in the same manner as Example 50 except that the weight of Copolymer (III) was increased from 10 parts by weight to 80 parts by weight and the weight of polystyrene-butadiene-styrene was reduced from 90 parts by weight to 20 parts by weight, obtaining Film (XXXIX). Next, the dielectric constant (Dk) and the dissipation factor (Df) of Film (XXXIX) were measured at 10 GHz, and the results are shown in Table 6.

Example 54

Example 54 was performed in the same manner as Example 45 except that polyphenylene ether was replaced with polybutadiene (PB, manufactured by Nippon Soda with a trade No. of B2000) (with a molecular weight of about 2,100), obtaining Film (XL). Next, the dielectric constant (Dk) and the dissipation factor (Df) of Film (XL) were measured at 10 GHz, and the results are shown in Table 6.

Example 55

Example 55 was performed in the same manner as Example 54 except that the weight of Copolymer (III) was increased from 10 parts by weight to 20 parts by weight and the weight of polybutadiene was reduced from 90 parts by weight to 80 parts by weight, obtaining Film (XLI). Next, the dielectric constant (Dk) and the dissipation factor (Df) of Film (XLI) were measured at 10 GHz, and the results are shown in Table 6.

Example 56

Example 56 was performed in the same manner as Example 45 except that polyphenylene ether was replaced with polystyrene (PS, manufactured by Sigma-Aldrich) (with a molecular weight of about 192,000), obtaining Film (XLII). Next, the dielectric constant (Dk) and the dissipation factor (Df) of Film (XLII) were measured at 10 GHz, and the results are shown in Table 6.

Example 57

Copolymer (III) (70 parts by weight) of Example 3, epoxy resin (manufactured by Epolab Chemical Industries Inc. with a trade No. of ERL-4221) (30 parts by weight) and an initiator (1 part by weight) were added into a reaction bottle, and then dissolved in toluene (50 parts by weight). After mixing completely, a resin composition was obtained. Next, the aforementioned resin composition was coated on a copper foil (manufactured and sold by Furukawa Circuit Foil Co., Ltd.). Next, the copper foil coated with the resin composition was heated at 90° C. for a period of time. Next, the above copper foil was then heated gradually and then the resin composition was subjected to a crosslinking reaction under a temperature lower than 250° C. (in order to achieve the best crosslinking density), obtaining Film (XLIII). Next, the dielectric constant (Dk) and the dissipation factor (Df) of Film (XLIII) were measured at 10 GHz, and the results are shown in Table 6.

Example 58

Copolymer (III) (31 parts by weight) of Example 3, polyphenylene ether (PPE, manufactured and sold by SABIC with a trade No. of SA9000) (with a molecular weight of about 2,300) (46 parts by weight), polybutadiene (PB, manufactured by Nippon Soda with a trade No. of B2000) (with a molecular weight of about 2,100) (23 parts by weight) and an initiator (1 part by weight) were added into a reaction bottle, and then dissolved in toluene (60 parts by weight). After mixing completely, a resin composition was obtained. Next, the aforementioned resin composition was coated on a copper foil (manufactured and sold by Furukawa Circuit Foil Co., Ltd.). Next, the copper foil coated with the resin composition was heated at 100° C. for a period of time. Next, the above copper foil was then heated gradually and then the resin composition was subjected to a crosslinking reaction under a temperature lower than 250° C. (in order to achieve the best crosslinking density), obtaining Film (XLIV). Next, the dielectric constant (Dk) and the dissipation factor (Df) of Film (XLIV) were measured at 10 GHz, and the results are shown in Table 6.

Example 59

Copolymer (V) (38 parts by weight) of Example 5, polyphenylene ether (PPE, manufactured and sold by SABIC with a trade No. of SA9000) (with a molecular weight of about 2,300) (57 parts by weight), bismaleimide (manufactured and sold by DAIWA KASEI CO., LTD) (5 parts by weight) and an initiator (1 part by weight) were added into a reaction bottle, and then dissolved in toluene (60 parts by weight). After mixing completely, a resin composition was obtained. Next, the aforementioned resin composition was coated on a copper foil (manufactured and sold by Furukawa Circuit Foil Co., Ltd.). Next, the copper foil coated with the resin composition was heated at 90° C. for a period of time. Next, the above copper foil was then heated gradually and then the resin composition was subjected to a crosslinking reaction under a temperature lower than 250° C. (in order to achieve the best crosslinking density), obtaining Film (XLV). Next, the dielectric constant (Dk) and the dissipation factor (Df) of Film (XLV) were measured at 10 GHz, and the results are shown in Table 6.

Example 60

Copolymer (III) (38 parts by weight) of Example 3, polyphenylene ether (PPE, manufactured and sold by SABIC with a trade No. of SA9000) (with a molecular weight of about 2,300) (57 parts by weight), polystyrene (PS, manufactured by Sigma-Aldrich) (with a molecular weight of about 192,000) (5 parts by weight) and an initiator (1 part by weight) were added into a reaction bottle, and then dissolved in toluene (60 parts by weight). After mixing completely, a resin composition was obtained. Next, the aforementioned resin composition was coated on a copper foil (manufactured and sold by Furukawa Circuit Foil Co., Ltd.). Next, the copper foil coated with the resin composition was heated at 100° C. for a period of time. Next, the above copper foil was then heated gradually and then the resin composition was subjected to a crosslinking reaction under a temperature lower than 250° C. (in order to achieve the best crosslinking density), obtaining Film (XLVI). Next, the dielectric constant (Dk) and the dissipation factor (Df) of Film (XLVI) were measured at 10 GHz, and the results are shown in Table 6.

Example 61

Example 61 was performed in the same manner as Example 60 except that polystyrene was replaced with cyanate ester resin (CE, manufactured and sold by Eumate International Corp. with a trade No. of BADCy), obtaining Film (XLVII). Next, the dielectric constant (Dk) and the dissipation factor (Df) of Film (XLVII) were measured at 10 GHz, and the results are shown in Table 6.

Example 62

Example 62 was performed in the same manner as Example 60 except that polystyrene was replaced with polyimide (PI), obtaining Film (XLVIII). Next, the dielectric constant (Dk) and the dissipation factor (Df) of Film (XLVIII) were measured at 10 GHz, and the results are shown in Table 6.

Comparative Example 5

Comparative Example 5 was performed in the same manner as Example 45 except that the weight of Copolymer (III) was reduced from 10 parts by weight to 1 part by weight and the weight of polyphenylene ether was increased from 90 parts by weight to 99 parts by weight, obtaining Film (XLIX). Next, the dielectric constant (Dk) and the dissipation factor (Df) of Film (XLIX) were measured at 10 GHz, and the results are shown in Table 6.

Comparative Example 6

Comparative Example 6 was performed in the same manner as Example 45 except that the weight of Copolymer (III) was increased from 10 parts by weight to 90 parts by weight and the weight of polyphenylene ether was reduced from 90 parts by weight to 10 parts by weight, obtaining Film (L). Next, the dielectric constant (Dk) and the dissipation factor (Df) of Film (L) were measured at 10 GHz, and the results are shown in Table 6.

Comparative Example 7

Comparative Example 7 was performed in the same manner as Example 57 except that the weight of Copolymer (III) was reduced from 70 parts by weight to 50 parts by weight and the weight of epoxy resin was reduced from 30 parts by weight to 50 parts by weight, obtaining Film (LI). Next, the dielectric constant (Dk) and the dissipation factor (Df) of Film (LI) were measured at 10 GHz, and the results are shown in Table 6.

Comparative Example 8

Phenolic novolac curing agent (manufactured and sold by Momentive with a trade No. of SD1708) (45 parts by weight), epoxy resin (manufactured by Epolab Chemical Industries Inc. with a trade No. of ERL-4221) (55 parts by weight) and an initiator (1 part by weight) were added into a reaction bottle, and then dissolved in toluene (50 parts by weight). After mixing completely, a resin composition was obtained. Next, the aforementioned resin composition was coated on a copper foil (manufactured and sold by Furukawa Circuit Foil Co., Ltd.). Next, the copper foil coated with the resin composition was heated at 100° C. for a period of time. Next, the above copper foil was then heated gradually and then the resin composition was subjected to a crosslinking reaction under a temperature lower than 250° C. (in order to achieve the best crosslinking density), obtaining Film (LII). Next, the dielectric constant (Dk) and the dissipation factor (Df) of Film (LII) were measured at 10 GHz, and the results are shown in Table 6.

Comparative Example 9

Copolymer (III) (1 parts by weight) of Example 3, polyimide (PI) (99 parts by weight), and an initiator (1 part by weight) were added into a reaction bottle, and then dissolved in toluene. After mixing completely, a resin composition was obtained. Next, the aforementioned resin composition was coated on a copper foil (manufactured and sold by Furukawa Circuit Foil Co., Ltd.). Next, the copper foil coated with the resin composition was heated at 100° C. for a period of time. Next, the above copper foil was then heated gradually and then the resin composition was subjected to a crosslinking reaction under a temperature lower than 250° C. (in order to achieve the best crosslinking density), obtaining Film (LIII). Next, the dielectric constant (Dk) and the dissipation factor (Df) of Film (LIII) were measured at 10 GHz, and the results are shown in Table 6.

Example 63

Copolymer (III) (17 parts by weight) of Example 3, polyphenylene ether (PPE, manufactured and sold by Mitsubishi Gas Chemical with a trade No. of OPE-2st (with a molecular weight of about 2,200) (70 parts by weight), polystyrene-butadiene-styrene (SBS, manufactured and sold by Cray Valley. with a trade No. of Ricon100) (with a molecular weight of about 4,500) (13 parts by weight) and an initiator (1 part by weight) were added into a reaction bottle, and then dissolved in toluene. After mixing completely, a composition was obtained. After stirring completely, a composition was obtained. Next, glass fiber (sold by Asahi Fiber Glass with a trade No. of L2116) was immersed in the aforementioned composition, wherein the impregnated amount was about 59%. After removing the glass fiber from the resin composition, the glass fiber was baked at 140° C. in a hot air circulating oven to keep the crosslinking degree to about 50%, obtaining a prepreg. Four prepregs were stacked, and a copper foil, a mirror plate, and a Kraft paper were disposed on the top surface and the bottom surface of the stacked structure. The obtained structure was heated to 210° C. gradually by a vacuum molding machine for 3 hr, obtaining Copper foil substrate (I) with a thickness of 0.558 mm. Next, the dielectric constant (Dk) and the dissipation factor (Df) of Copper foil substrate (I) were measured at 10 GHz, and the results are shown in Table 7.

TABLE 6

| | Components of composition | | | Dielectric constant (10 GHz) | Dissipation factor (10 GHz) |
|---|---|---|---|---|---|
| Example 45 | 10 wt % Copolymer (III) | 90 wt % PPE | — | 2.57 | 0.0033 |
| Example 46 | 20 wt % Copolymer (III) | 80 wt % PPE | — | 2.57 | 0.0030 |
| Example 47 | 80 wt % Copolymer (III) | 20 wt % PPE | — | 2.45 | 0.0031 |
| Example 48 | 70 wt % Copolymer (I) | 30 wt % SBS | — | 2.35 | 0.0021 |
| Example 49 | 70 wt % Copolymer (VIII) | 30 wt % SBS | — | 2.25 | 0.0030 |
| Example 50 | 10 wt % Copolymer (III) | 90 wt % SBS | — | 2.43 | 0.0015 |
| Example 51 | 20 wt % Copolymer (III) | 80 wt % SBS | — | 2.36 | 0.0015 |
| Example 52 | 50 wt % Copolymer (III) | 50 wt % SBS | — | 2.14 | 0.0032 |
| Example 53 | 80 wt % Copolymer (III) | 20 wt % SBS | — | 2.25 | 0.0031 |
| Example 54 | 10 wt % Copolymer (III) | 90 wt % PB | — | 2.40 | 0.0035 |
| Example 55 | 20 wt % Copolymer (III) | 80 wt % PB | — | 2.33 | 0.0013 |
| Example 56 | 10 wt % Copolymer (III) | 90 wt % PS | — | 2.54 | 0.0010 |
| Example 57 | 70 wt % Copolymer (III) | 30 wt % epoxy resin | — | 2.22 | 0.0037 |
| Example 58 | 31 wt % Copolymer (III) | 23 wt % PB | 46 wt % PPE | 2.35 | 0.0018 |
| Example 59 | 38 wt % Copolymer (V) | 5 wt % BMI | 57 wt % PPE | 2.48 | 0.0026 |
| Example 60 | 38 wt % Copolymer (III) | 5 wt % PS | 57 wt % PPE | 2.50 | 0.0026 |
| Example 61 | 38 wt % Copolymer (III) | 5 wt % CE | 57 wt % PPE | 2.62 | 0.0017 |
| Example 62 | 38 wt % Copolymer (III) | 5 wt % PI | 57 wt % PPE | 2.63 | 0.0045 |
| Comparative Example 5 | 1 wt % Copolymer (III) | 99 wt % PPE | | 2.59 | 0.0052 |
| Comparative Example 6 | 90 wt % Copolymer (III) | 10 wt % PPE | — | 2.51 | 0.0060 |
| Comparative Example 7 | 50 wt % Copolymer (III) | 50 wt % epoxy resin | — | 2.38 | 0.0059 |
| Comparative Example 8 | 45 wt % phenolic novolac curing agent | 55 wt % epoxy resin | — | 3.31 | 0.0449 |
| Comparative Example 9 | 1 wt % Copolymer (III) | 99 wt % PI | — | 3.15 | 0.0138 |

TABLE 7

|  | Components of resin composition | Dielectric constant (10 GHz) | Dissipation factor (10 GHz) |
|---|---|---|---|
| Example 63 | 17 wt % Copolymer (III) 70 wt % PPE 13 wt % SBS | 2.96 | 0.0033 |

As shown in Tables 4-7, since the resin composition includes an oligomer having a structure represented by Formula (I), the cured product exhibits a relatively low dielectric constant (less than or equal to 3.0 (at 10 GHz) and a relatively low dissipation factor (less than or equal to 0.0045 (at 10 GHz)), thereby serving as a good material for a high-frequency substrate. As shown in the above Examples, the resin composition of the disclosure can be crosslinked at a temperature lower than 250° C., and the obtained oligomer exhibits superior crosslinking density. Furthermore, the oligomer can achieve optimal crosslinking density which is checked by means of the crosslinking exotherm determined by differential scanning calorimetry.

It will be clear that various modifications and variations can be made to the disclosed methods and materials. It is intended that the specification and examples be considered as exemplary only, with the true scope of the disclosure being indicated by the following claims and their equivalents.

What is claimed is:

1. An oligomer, having a structure represented by Formula (I)

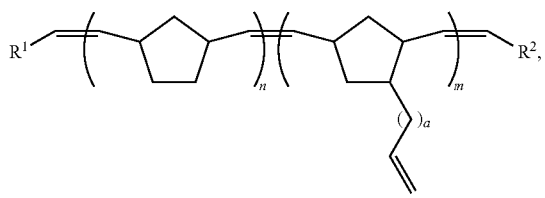

Formula (I)

wherein $R^1$ and $R^2$ are independently hydrogen, $C_{1-20}$ alkyl group, $C_{2-20}$ alkenyl group, $C_{6-12}$ aryl group, $C_{6-12}$ alkylaryl group, $C_{5-12}$ cycloalkyl group, $C_{6-20}$ cycloalkylalkyl group, alkoxycarbonyl group, or alkylcarbonyloxy group; $R^1$ is not hydrogen when $R^2$ is hydrogen; a is 0 or 1; n≥0; m≥1; n:m is from 0:100 to 99:1; and the repeat unit

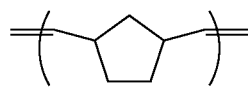

and the repeat unit

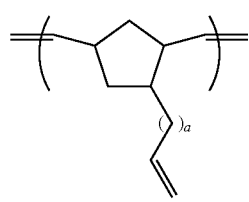

are arranged in a random or block fashion, and wherein the oligomer has a number average molecular weight which is in a range from 800 to 6,000.

2. The oligomer as claimed in claim 1, wherein $R^1$ and $R^2$ are independently hydrogen, or

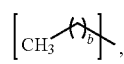

and wherein b is 0, or an integer from 1 to 19; and $R^1$ is not hydrogen when $R^2$ is hydrogen.

3. The oligomer as claimed in claim 1, wherein $R^1$ and $R^2$ are independently hydrogen, or

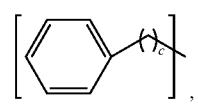

wherein c is 0, or an integer from 1 to 6; and $R^1$ is not hydrogen when $R^2$ is hydrogen.

4. The oligomer as claimed in claim 1, wherein $R^1$ and $R^2$ are independently hydrogen, or

and wherein d is 0, or an integer from 1 to 6; and $R^1$ is not hydrogen when $R^2$ is hydrogen.

5. The oligomer as claimed in claim 1, wherein $R^1$ and $R^2$ are independently hydrogen, or

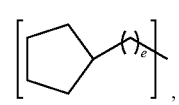

wherein e is 0, or an integer from 1 to 6; and $R^1$ is not hydrogen when $R^2$ is hydrogen.

6. The oligomer as claimed in claim 1, wherein $R^1$ and $R^2$ are independently hydrogen, or

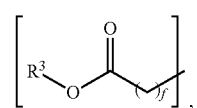

and wherein f is 0, or an integer from 1 to 6; $R^3$ is $C_{1-6}$ alkyl group; and $R^1$ is not hydrogen when $R^2$ is hydrogen.

7. The oligomer as claimed in claim 1, wherein $R^1$ and $R^2$ are independently hydrogen, or

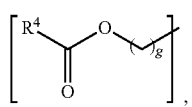

and wherein g is 0, or an integer from 1 to 6; $R^4$ is $C_{1-6}$ alkyl group; and $R^1$ is not hydrogen when $R^2$ is hydrogen.

8. The oligomer as claimed in claim 1, wherein $R^1$ and $R^2$ are independently hydrogen, or

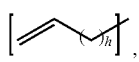

wherein h is an integer from 1 to 6; and $R^1$ is not hydrogen when $R^2$ is hydrogen.

9. The oligomer as claimed in claim 1, wherein $R^1$ and $R^2$ are independently hydrogen, or

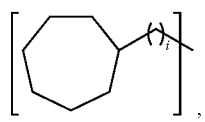

wherein i is 0, 1, 2, 3, 4, 5, or 6; and $R^1$ is not hydrogen when $R^2$ is hydrogen.

10. The oligomer as claimed in claim 1, wherein $R^1$ and $R^2$ are independently hydrogen, or wherein j is 0, 1, 2, 3, 4, 5, or 6; and $R^1$ is not hydrogen when $R^2$ is hydrogen.

11. The oligomer as claimed in claim 1, wherein n:m is from 1:9 to 9:1.

12. A resin composition, comprising:
    10-90 parts by weight of the oligomer as claimed in claim 1; and
    10-90 parts by weight of resin.

13. The resin composition as claimed in claim 12, wherein the resin is polyolefin resin, epoxy resin, cyanate resin, polystyrene resin, styrene-butadiene copolymer resin, polyimide resin, maleimide resin, polyphenylene ether resin, or a combination thereof.

14. The resin composition as claimed in claim 13, wherein the polyolefin resin is polybutadiene resin, polyalkenamer resin, cyclic olefin polymer resin, or cycloolefin copolymer resin.

15. A composite material, comprising:
    a cured product or a semi-cured product prepared by the resin composition as claimed in claim 12; and
    a substrate, wherein the cured product or the semi-cured product is disposed on the substrate or disposed within the substrate.

16. The composite material as claimed in claim 15, wherein the substrate is glass fiber or copper foil.

17. The composite material as claimed in claim 15, wherein the composite material is a copper foil substrate, a printed circuit board, or an integrated circuit carrier.

* * * * *